United States Patent [19]

Kohno et al.

[11] Patent Number: 5,404,190
[45] Date of Patent: Apr. 4, 1995

[54] OPTICAL APPARATUS

[75] Inventors: Takahiro Kohno; Hitoshi Narita; Akira Fukusima, all of Kanagawa, Japan

[73] Assignee: Canon Kabushiki Kaisha, Tokyo, Japan

[21] Appl. No.: 960,849

[22] Filed: Oct. 14, 1992

Related U.S. Application Data

[60] Division of Ser. No. 886,319, May 22, 1992, Pat. No. 5,177,520, which is a continuation of Ser. No. 444,303, Dec. 1, 1989, abandoned.

Foreign Application Priority Data

Dec. 5, 1988 [JP] Japan ................. 63-308407
Dec. 5, 1988 [JP] Japan ................. 63-308408
Jan. 27, 1989 [JP] Japan ................. 1-018010

[51] Int. Cl.6 ............................... G03B 17/00
[52] U.S. Cl. ............................... 354/286
[58] Field of Search ......................... 354/286

[56] References Cited

U.S. PATENT DOCUMENTS

| | | | |
|---|---|---|---|
| 4,448,509 | 5/1988 | Katsuma et al. | 354/286 |
| 4,620,780 | 11/1986 | Maekawa et al. | 354/286 |
| 4,699,491 | 10/1987 | Ishimura | 354/286 |
| 4,758,354 | 7/1988 | Saegusa | 354/286 |
| 4,853,725 | 8/1989 | Matsuda et al. | 354/286 |
| 4,999,659 | 3/1991 | Fukahori et al. | 354/286 |
| 5,021,812 | 6/1991 | Kohno et al. | 354/286 |
| 5,079,578 | 1/1992 | Kohno et al. | 354/286 |

FOREIGN PATENT DOCUMENTS 3744342 7/1988 Germany.

Primary Examiner—David M. Gray
Attorney, Agent, or Firm—Fitzpatrick, Cella, Harper & Scinto

[57] ABSTRACT

In an optical apparatus having a group of contacts for electrical connection with another apparatus, a plurality of contacts for communication are disposed between a power-supply contact and a grounding contact; the power-supply and grounding contacts are spaced at a larger distance away from adjoining communication contacts than the spacing distance provided between communication contacts; the group of contacts are electrically connected by spring members to patterns formed on a contact substrate; and the width of patterns provided for the power-supply and grounding contacts is arranged to be wider than the width of patterns for the communication contacts.

29 Claims, 11 Drawing Sheets

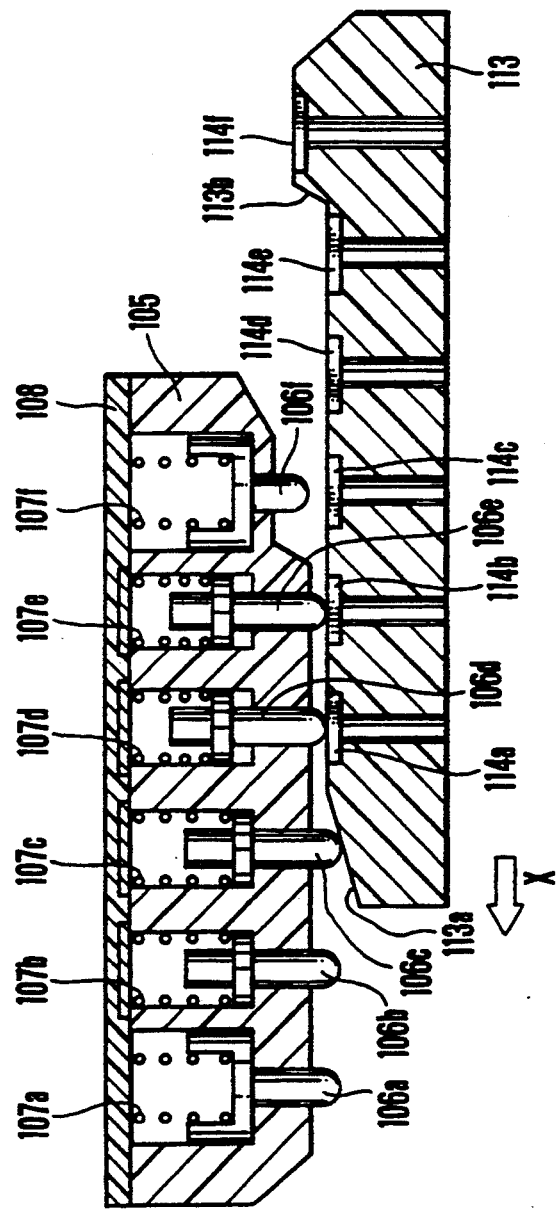

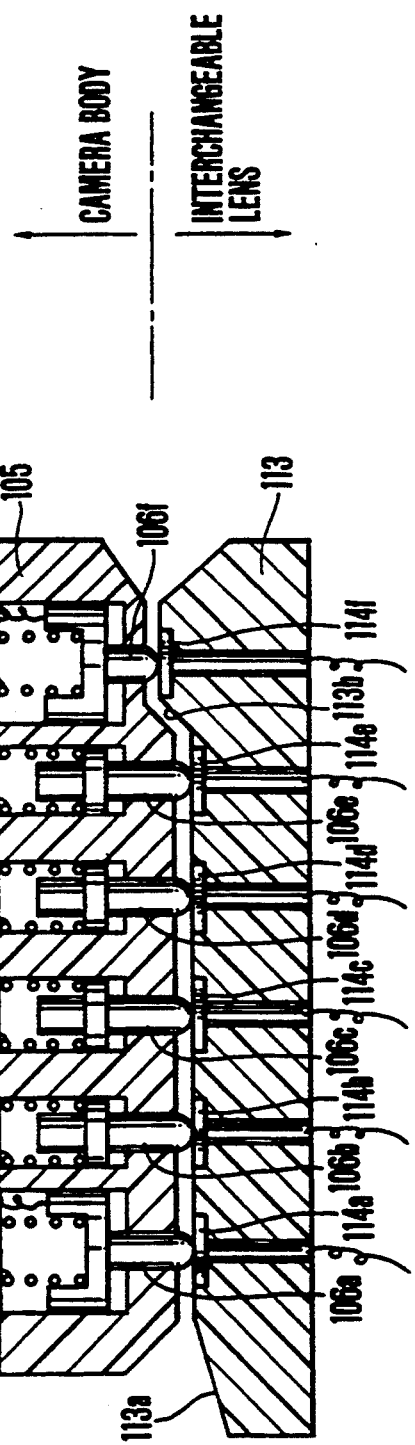

OPTICAL APPARATUS

This application is a division of application Ser. No. 07/886,319, filed May 22, 1992, now U.S. Pat. No. 5,177,520, which is a continuation of Ser. No. 07/444,303, filed Dec. 1, 1989, now abandoned.

BACKGROUND OF THE INVENTION

1. Field of the Invention

This invention relates to an optical apparatus including a camera body and an interchangeable lens, etc.

2. Description of the Related Art

It has recently come to be practiced to arrange an LSI within an interchangeable lens of a camera system to permit power supply to the lens and communication between the lens and a camera body. Information pertaining to the lens is thus supplied to the camera body and an actuator disposed within the lens is controlled from within the camera body. In this instance, electrical connections between the lens and camera body are effected through groups of connecting contacts. Generally, one of the contact groups is arranged to be movable in the direction of contact while the other group is arranged to be stationary. On the side of the movable connection contact group, pin-shaped contacts are carried by a support member in such a way as to be movable in the contacting direction. The electrical connections are attained jointly by the groups of patterns provided on contact substrates and individual coiled springs made of a conductive material.

FIG. 5 of the accompanying drawings shows the conventional arrangement of a group of patterns 24a provided on a contact substrate 24. Each pattern 24a is formed in a size suited for contact with one of the coiled springs 23. The conventional patterns shown in FIG. 5 are evenly spaced at a pitch C. Therefore, the width of the whole pattern group 24a increases accordingly as the number of connection contacts increases. Meanwhile, it is a recent trend to have a greater number of connection contacts. As a result, a total angle occupied by these patterns 24a is approaching to 90 degrees as shown in FIG. 5. However, in mounting the interchangeable lens on the camera body, the increased angle necessitates the lens to be rotated relative to the camera body to a greater angle. Besides, the sliding distance of the connection contacts increases accordingly. The increased sliding distance then results in increased wear.

Further, U.S. Pat. No. 4,448,509 discloses a camera system, wherein among the group of contacts which include power-supply and grounding contacts which are related to the power supply, only the power-supply contact is disposed away from other contacts.

FIG. 6 shows the essential parts of a camera body to which the invention under the present application is related (not prior art). Referring to FIG. 6, a group of connection contacts and a group of patterns 24a which are arranged to be brought into electrical contact with the contact group by means of conductive coiled springs are formed on a contact substrate 24. FIG. 6 shows the contact substrate 24 as viewed from the reverse side (from the rear in the direction of an optical axis). Therefore, the patterns 24a are depicted with broken lines. The contact substrate 24 is secured with screws 25 to a substrate holder 21. The substrate holder 21 is in turn secured with screws 26 to a structural member 18 of the camera body.

The connection contacts of the camera body are disposed round the optical axis in the peripheral part of an area which is arranged to transmit a light flux coming from an object to be photographed. Therefore, the contact substrate 24 also extends round the optical axis. The substrate holder 21 also extends round the optical axis in such a way as to have the contact substrate 24 superposed thereon.

In the case of FIG. 6, the substrate holder 21 is screwed to structural member 18 of the camera body in a position to protrude from the contact substrate 24 in the direction around the optical axis. This has presented a problem that the length of a flange-back cannot be shortened. In other words, the area around the optical axis having the connection contact group is arranged to cause the flange-back to be affected by the thickness of the structural member 18 of the camera body. In order that the substrate holder 21 is firmly fixed, the mounting screws 26 must have a sufficient length in the structural member 18. Hence, it has been difficult to shorten the flange-back. It is another problem that the contact substrate 24 might be warped by the urging forces of the coiled springs. In other words, the connection contact group of the camera body is carried by the substrate holder 21 in such a way as to be movable in the direction of the optical axis. Under this condition, each contact of the contact group is electrically connected by each coiled spring to a corresponding pattern of the pattern group. The resilient force of the coiled springs, which increases when the connection contact group is pushed by coming into contact with the connection contact group disposed on the side of an accessory such as an interchangeable lens, is applied to the contact substrate 24. Then, since the contact substrate 24 is fixedly secured to the substrate holder 21, the strong resilient force acts to warp the contact substrate 24 and the substrate holder 21 on the screws 26. In FIG. 6, a reference symbol $l_3$ denotes a distance between each of the screws 26 and a coiled spring located farthest from the screw 26. The above-stated warping force acts substantially more strongly as this distance $l_3$ increases. The warp may be prevented by increasing the strength of the substrate holder 21 by increasing its thickness. However, such a method is not desirable in respect of cost and the flange-back.

Further, with regard to the camera system of the above-stated kind, U.S. Pat. No. 4,999,659 issued Mar. 12, 1991 and U.S. Pat. No. 5,021,872 issued Jun. 4, 1991, have proposed a method of reducing the contact resistance of connection terminals which are related to the power supply among the electrical connection terminals of the camera body and the accessory by arranging these power-supply related terminals to have a greater contact pressure between them than contact pressure between other terminals. According to the method, the coiled springs themselves are arranged to serve as electrical conduction paths. In cases where contact resistance is to be set at such a small value that is less than 0.1 ohm, this arrangement hardly meets the requirement, because each of the coiled springs has an electrical resistance value much greater than 0.1 ohm.

SUMMARY OF THE INVENTION

It is one aspect of this invention to provide an optical apparatus having a group of information communicating contacts disposed between a power-supply contact and a grounding contact, wherein the power-supply contact and the grounding contact are spaced away from the respective adjacent contacts at a greater pitch than a spacing pitch between the communication contacts.

It is another aspect of the invention to provide an optical apparatus having a contact substrate (or a printed circuit board) provided with patterns which are made to be electrically conductive in conjunction with contacts by spring members, wherein the patterns for contacts related to a power supply are arranged to be wider than others.

These and other aspects and features of the invention will become apparent from the following detailed description of embodiments thereof taken in connection with the accompanying drawings.

BRIEF DESCRIPTION OF THE DRAWINGS

FIGS. 10(a), 10(b) and 10(c) are enlarged sectional views taken on line A—A of FIG. 7 showing essential parts of the embodiment as under a lens mounting action performed by rotating the mount parts.

DETAILED DESCRIPTION OF THE PREFERRED EMBODIMENTS

Figure 1:
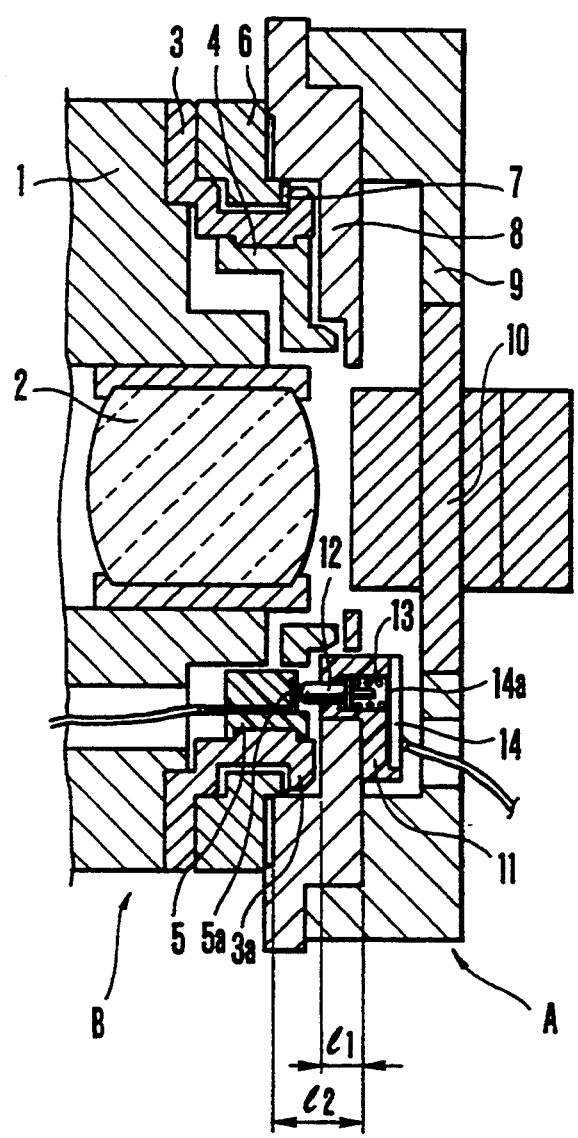
FIG. 1 is a sectional view showing a first embodiment of this invention as in a state of having an interchangeable lens mounted on a camera body.
Figure 2:
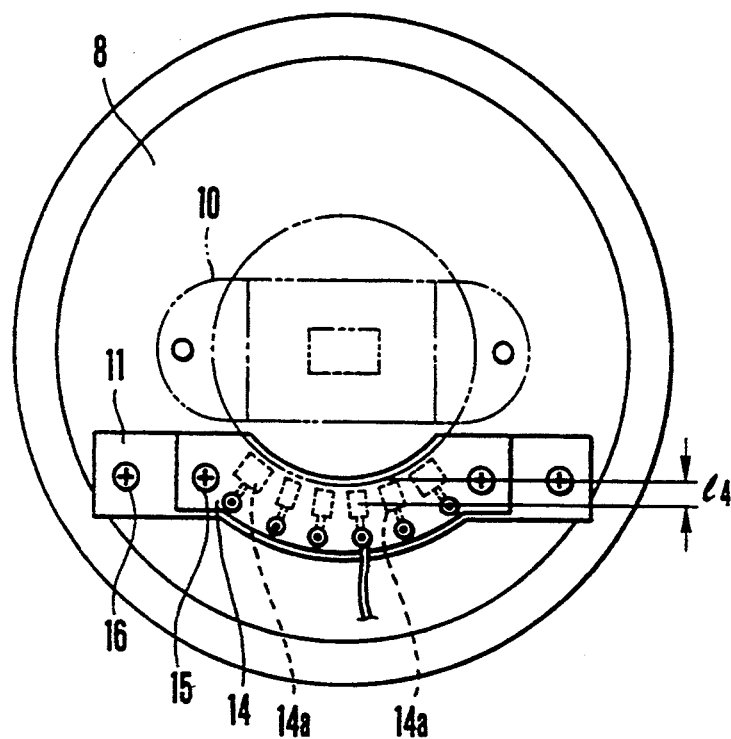
FIG. 2 shows the first embodiment as viewed from the rear of the optical axis thereof with an image sensing body fixing holder removed from the camera body.

A first embodiment of this invention is arranged as shown in FIGS. 1 to 4. FIG. 1 is a sectional view showing the essential parts of the first embodiment as in a state of having an interchangeable lens B mounted on a video camera body A. FIG. 2 shows the video camera body A as viewed from the reverse side thereof (the rear side of an optical axis) with an image sensing body fixing holder removed from the camera body.

These illustrations include a lens body 1; a lens (a relay lens) 2; a bayonet mount 3 disposed on the side of the lens; a cover 4 on the lens side; a lens-side contact holder 5 which is secured to the lens-side bayonet mount 3 and has a group of lens-side contacts 5a inserted therein with these contacts arranged round the optical axis of the lens; a bayonet mount 6 disposed on the side of the camera body; an urging spring 7 which is arranged to exert a resilient force in the direction of the optical axis to bring the surfaces of the two mounts 3 and 6 into close contact when the lens is mounted by rotating them; a camera body 8; an image sensing body fixing holder 9; and an image sensing body 10 which includes a filter, an image sensor such as a CCD, etc. and is secured to the holder 9. A substrate holder 11 is arranged to serve as a substrate holding member. Camera-side contacts 12 are disposed on the side of the camera body and are arranged round the optical axis. Coiled springs 13 are made of a conductive material. A contact substrate 14 is provided for the contacts 12. The contacts 12 disposed on the side of the camera body (hereinafter referred to as camera-side contacts) are in a position to come into contact with the corresponding contacts 5a disposed on the side of the lens (hereinafter referred to as lens-side contacts) when the two mounts 3 and 6 are rotated in mounting the lens on the camera body. The camera-side contacts 12 are carried by the substrate holder 11 in such a way as to be movable in the direction of contact, i.e. in the direction of the optical axis. Further, patterns 14a for the contacts are formed on the contact substrate 14 in positions confronting the camera-side contacts 12. The contacts 12 and the patterns 14a are electrically connected by the coiled springs 13. Screws 15 are used for securing the contact substrate 14 to the substrate holder 11.

Figure 3:
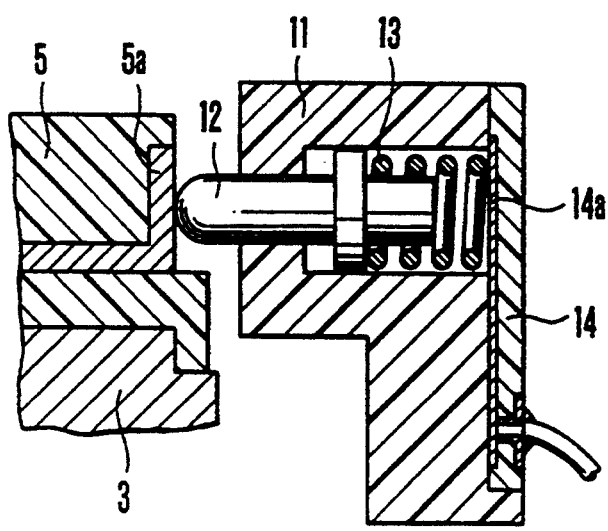
FIG. 3 is an enlarged sectional view of a substrate holder part of FIG. 1.
Figure 4:
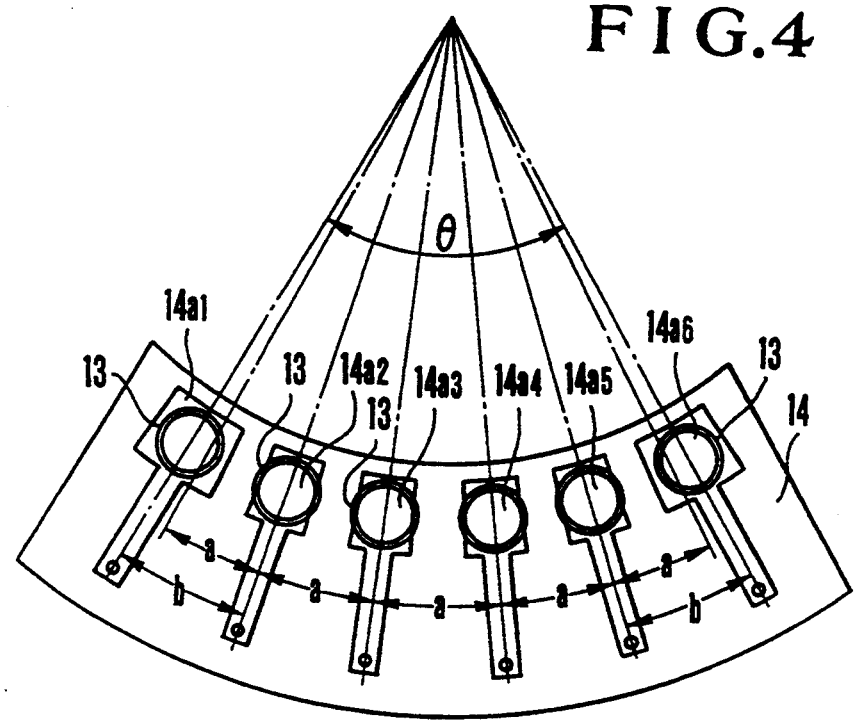
FIG. 4 is an enlarged view showing only a contact substrate of FIG. 1 as viewed from the front of the optical axis.
Figure 5:
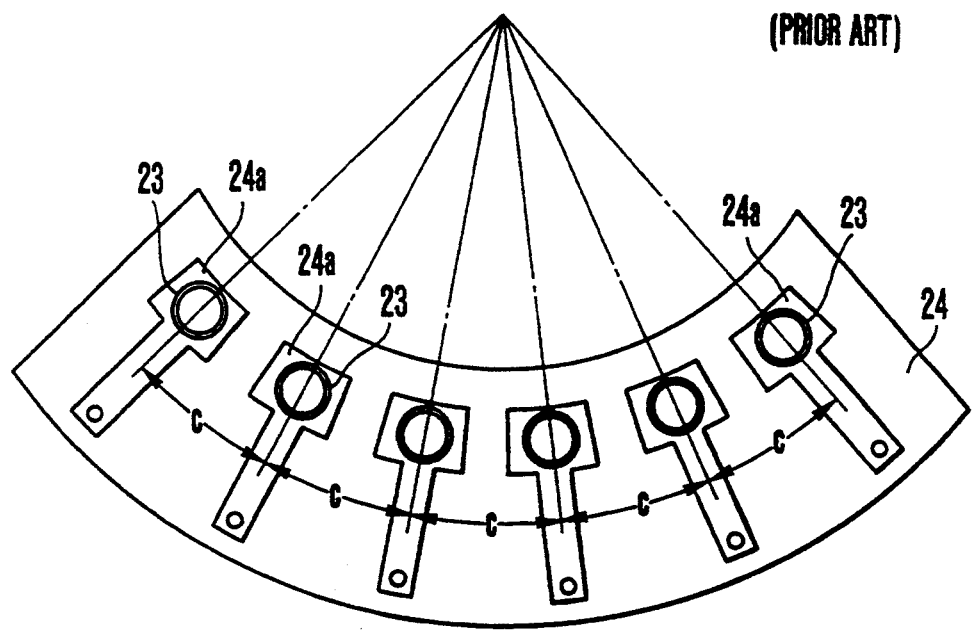
FIG. 5 is an enlarged view showing the conventional contact substrate.

The image sensing body 10 is actually in an invisible position as viewed on FIG. 2 but is indicated with two-dot chain line. FIGS. 3 shows the substrate holder 11 in an enlarged state. FIG. 4 shows only the contact substrate 14 in an enlarged state as viewed from the front side of the optical axis.

The patterns 14a formed on the contact substrate 14 consist of six patterns including two end patterns 14a1 and 14a6 which are related to a power supply. Other patterns 14a2 to 14a5 are provided for communication of information. More specifically, the pattern 14a1 is provided for the power supply while the pattern 14a6 is a grounding pattern. Other patterns 14a2 to 14a5 are provided for communication of clock signals and for transmitting and receiving data, etc.

Compared with a spacing pitch "a" between the patterns for communication, the power-supply related patterns 14a1 and 14a6 are disposed at a greater pitch "b" away from the adjacent patterns 14a2 and 14a5 respectively. In other words, this means that the spacing pitch "a" among the communication patterns is set at a smaller value than the conventional arrangement.

Further, the power-supply related patterns 14a1 and 14a6 are arranged to have a wider width, in the direction of the row of the patterns, than other patterns 14a2 to 14a5. This means that the width in the direction of row of the communication patterns 14a2 to 14a5 is arranged to be a little smaller than the diameter of the coiled springs 13, while the width of the power-supply related patterns 14a1 and 14a6 is arranged to be a little larger than the diameter of the coiled springs 13 in the same manner as in the case of the conventional arrangement.

This results from an attempt to make the total width in the direction of row of all the patterns 14a1 to 14a6, i.e., an angle θ occupied by all the patterns, smaller than the conventionally required width or angle.

It is necessary to have a certain spacing distance between one pattern and another for the purpose of preventing a leak or the like due to a printing error or conductive dust. Therefore, mere reduction in the pitch between patterns would bring about such problems as erroneous contact, a leak, etc. due to an insufficient clearance between the patterns.

In the case of this embodiment, the power-supply related patterns 14a1 and 14a6 are separately considered from the communication related patterns 14a2 to 14a5. The power-supply related patterns 14a1 and 14a6 which have a severe allowable value for contact resistance (0.1 ohm, for example) are allowed to have a wide width in the direction of row (like in the case of the conventional arrangement). Meanwhile, the width in the same direction of the communication related patterns 14a2 to 14a5 which have a less severe allowable value of contact resistance (1 ohm, for example) than the patterns 14a1 and 14a6 is arranged to be less than that of the patterns 14a1 and 14a6 (less than the conventional arrangement). With the width thus reduced, the pitch "a" among the patterns 14a2, 14a3, 14a4 and 14a5 is arranged to be smaller than the pitch "b" between the patterns 14a1 and 14a2 and between the patterns 14a6 and 14a5 accordingly.

By virtue of this arrangement, the embodiment has a smaller total width (or angle $\theta$) of the patterns 14a1 to 14a6 with apposite clearance provided between them without any adverse effect on the communication and the power supply. This improves the operability of the embodiment and shortens the sliding distance of the contacts to be rotated in mounting the interchangeable lens B on the camera body A as the turning angle of the lens for mounting is reduced to about 60 degrees. Therefore, the contacts wear to a less degree.

Figure 6:
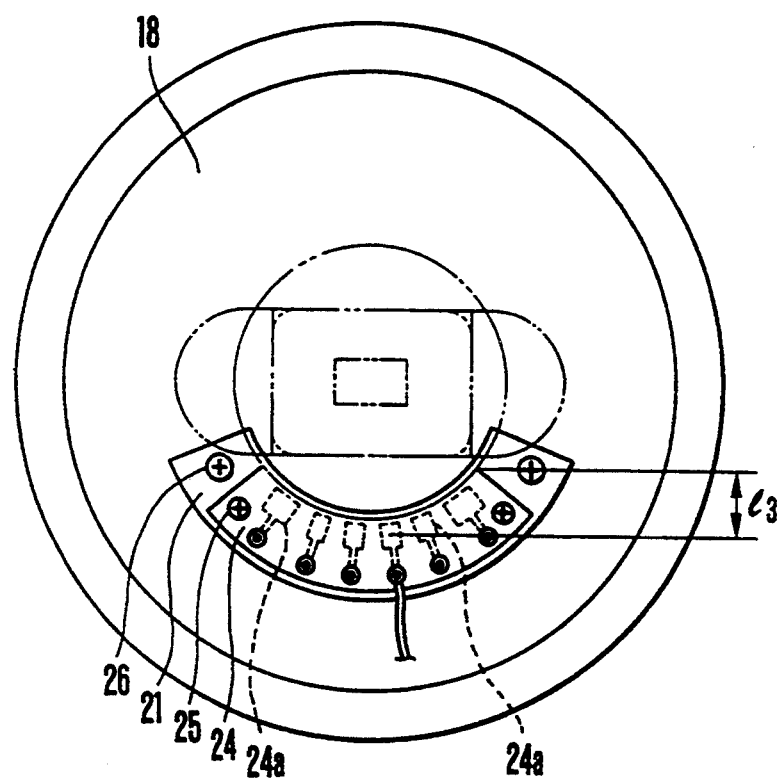
FIG. 6 shows a part of the camera body related to this invention as viewed from the rear of the optical axis with an image sensing body fixing holder removed from the camera body.
Figure 7:
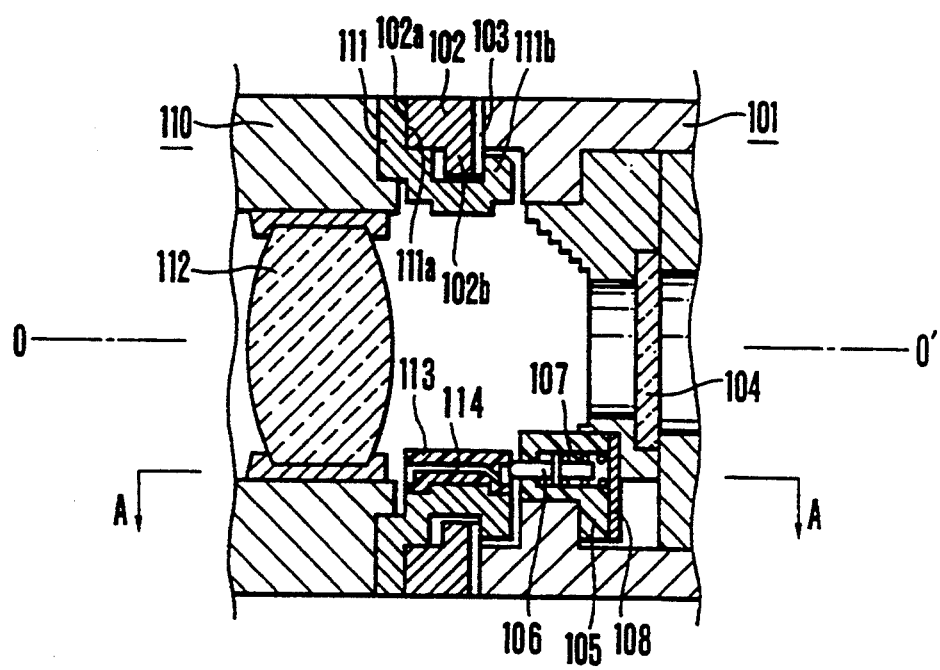
FIG. 7 is a sectional view showing a second embodiment of the invention with an interchangeable lens mounted on a camera body.
Figure 8:
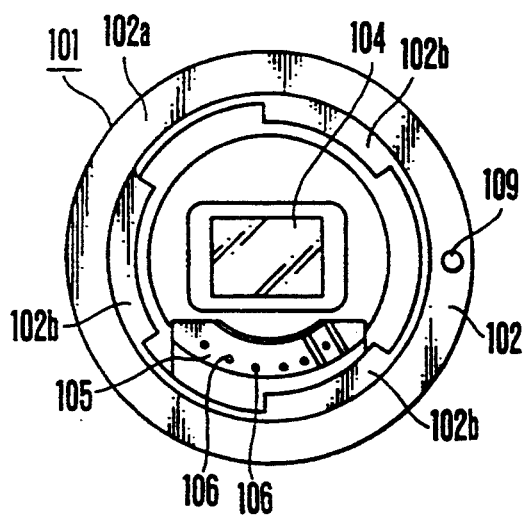
FIG. 8 shows a part of the camera body of FIG. 7 as viewed from a mount part thereof.
Figure 9:
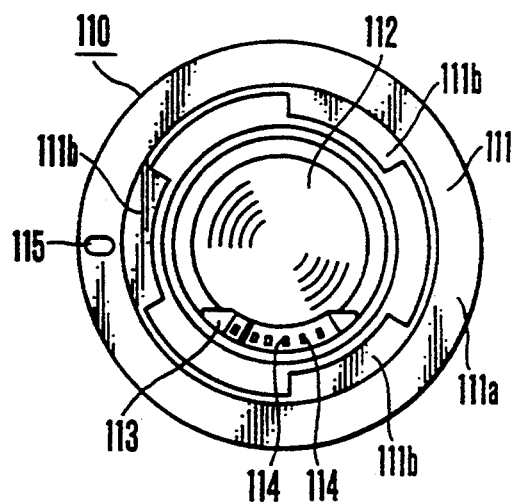
FIG. 9 shows the interchangeable lens of FIG. 7 as viewed from the mount part of the lens.

The substrate holder 11 is fixed to the camera body 8 by the screws 16 at points which are near to the two ends thereof and are located away from the diameter of the mount. The fixing points are located at a thick portion (measuring $l_2$ in thickness) of the camera body 8. Therefore, the screws 16 can be allowed to have a sufficient length to present no problem in terms of strength. A part having the camera-side contacts 12 located in the vicinity thereof must be arranged to be thin (measuring $l_1$ in thickness) as the claw part 3a of the lens-side bayonet mount 3 of the interchangeable lens B is to be located there. If this specific part which is near the contacts 12 is arranged to be thick, the flange-back of the camera would become longer. In the case of this (first) embodiment, the substrate holder fixing point is extended to a part which is allowable to have an increased thickness. This arrangement permits an increase in fixing strength without affecting the flange-back. Further, as shown in FIG. 2, a distance between the screw 16 at which the substrate holder 11 is fixed and the coiled spring 13 which is farthest from the screw (in the direction of diameter) is indicated as $l_4$. The distance $l_4$ is less than the distance $l_3$ which is shown in FIG. 6. Therefore, a force for warping the contact substrate 14 and the substrate holder 11 around the screw 16 due to the resilient force of the coiled spring 13 is weak as compared with that shown in FIG. 6, so that the adverse effect of warping can be lessened by the above-stated arrangement.

The interchangeable lens B is mounted on the camera body A by inserting the lens-side bayonet mount 3 into the camera-side bayonet mount 6 and then by rotating the mount 3 to a given degree of angle (say, 60 degrees). Upon completion of rotation to the given degree, the two mounts 3 and 6 are interlocked by a lock mechanism which is not shown. When the lens-side bayonet mount 3 is rotated to be coupled with the camera-side bayonet mount 6, the lens-side contacts 5a slide over the camera-side contacts 12. Then, each corresponding pair of contacts come into contact with each other upon completion of mounting. As mentioned in the foregoing, the camera-side contacts are resiliently urged by the coiled springs 13 to be electrically connected to the patterns 14a. Therefore, any positional error arising between the two contact groups in the direction of the optical axis can be absorbed by virtue of the resilient urging force. The urging force also gives adequate contact pressure.

In the first embodiment described above, the two ends of the substrate holder 11 are arranged to extend away from the area of the camera-side contacts 12 round the optical axis. This arrangement not only gives the advantage of having a shorter flange-back but also lessens a restriction on the shape of the image sensing body 10. More specifically, in the case of FIG. 6, the two end parts of the substrate holder 21 in the direction of the optical axis overlap the image sensing body 10. Therefore, the thickness of the overlapped part of the image sensing body 10 is limited. Whereas, in accordance with the arrangement of the embodiment, the two end parts of the substrate holder 11 are not overlapping the image sensing body 10 in the direction of the optical axis as apparent from FIG. 2. Therefore, no restriction is imposed on the thickness of the image sensing body 10 in the direction of the optical axis.

While this invention has been described in the foregoing as applied to the camera body A of the first embodiment, it goes without saying that the arrangement of the invention is likewise applicable also to the interchangeable lens and other optical apparatuses, such as an intermediate ring, converter, etc.

Further, in the embodiment described, the substrate holder 11 is screwed directly to the camera body 8. However, the same advantageous effect is attainable also by securing the holder 11 to the camera body 8 through some suitable member.

In the case of the embodiment described, the power-supply related patterns 14a1 and 14a6 are positioned at the two ends. However, they can be disposed in any suitable positions other than the end positions.

All the contacts of the two contact groups 5a and 12 are arranged to have one and the same height in the contact direction (in the direction of the optical axis) in the case of the first embodiment. However, this may be changed to arrange them to have a stepped difference in contact height. For example, the grounding contact alone may be arranged to have a different height from others. The stepped difference in height can be arranged such that the sliding contact distance between contacts is shortened to ensure a less degree of wear.

Further, in the case of the first embodiment, both the power-supply related patterns 14a1 and 14a6 are arranged to have a wider width in the direction of row and a larger pitch "b" than other patterns. However, in cases where the electrical characteristic of the camera system does not necessitate the power-supply related patterns to have a particularly severe allowable value for the contact resistance, they may be arranged in the same manner as other patterns. For example, where a motor and an LSI are arranged to share a power supply, a pattern for the power supply and a pattern for grounding are arranged for the LSI separately from a power-supply pattern and a grounding pattern for the motor. Generally, however, the allowable value for the contact resistance of the power-supply and grounding patterns for an LSI is not critical. Therefore, the power-supply and grounding patterns for the LSI can be arranged to have the same width and the same pitch as other patterns provided for communication.

The contact substrate 14 and the substrate holder 11 are arranged as separate members in the embodiment described. However, they may be arranged as one part by changing the arrangement for supporting the camera-side contact group 12.

The arrangement of the first embodiment described above enables the optical apparatus to improve its operability and lessen the wear of the contacts by shortening the total width of the group of patterns for the contacts without the fear of erroneous contact and a leak between the patterns and also without any adverse effect on the contact resistance.

It is another advantage of the first embodiment that the optical apparatus can be arranged in a compact size as the flange-back does not have to be long.

FIGS. 7 to 12 show a second embodiment of the invention. In this case, the invention is also applied to a video camera system. These figures include a video camera body 101; and a bayonet type camera mount 102 which is fixedly secured to the camera body 101 and is arranged to permit removable coupling. The mount 102 consists of a mount impinging face 102a which serves as a datum in the direction of an optical axis and three mount claws 102b. A leaf spring 103 is arranged to bring into close contact with each other the camera mount 102 and a lens mount by abutting on the mount claw of the lens mount. A reference numeral 104 denotes an optical filter. A numeral 105 denotes a camera-side contact holder 105. Camera-side contacts 106 are electrical connection terminals which are carried by the camera-side contact holder 105 in such a way as to be movable in the direction of contact, i.e., in the direction of the optical axis 0-0', including six contacts 106a to 106f. Conductive springs 107 including a total of six springs 107a to 107f are arranged to resiliently urge the camera-side contacts 106a to 106f to move in the direction of contact. A printed circuit board 108 is arranged to be electrically connected to the camera-side contacts 106b to 106e through the springs 107b to 107e. The board 108 is provided with patterns which are located in positions corresponding to the camera-side contacts 106b to 106e (and the springs 107b to 107e). Meanwhile, the camera-side contacts 106a and 106f are electrically connected via lead wires 121 and 122 to corresponding patterns provided on the printed circuit board 108. A lock pin 109 is arranged to be extractable from a position to protrude from the mount impinging face 102a by means of an operation member which is not shown and to permit locking and unlocking in mounting and dismounting an interchangeable lens. A reference numeral 110 denotes the interchangeable lens which is employed as an optical accessory. A bayonet type lens mount 111 is secured to the lens 110. The lens mount 111 has a mount impinging face 111a which serves as a datum in the direction of the optical axis and three mount claws 111b. A numeral 112 denotes an image forming lens. A numeral 113 denotes a lens-side contact holder. To the holder 113 are secured (inserted) lens-side contacts 114 which are electrical connection terminals and include a total of six contacts 114a to 114f which are arranged to come into contact with the camera-side contacts 106a to 106f. A lock slot 115 is arranged to allow the lock pin 109 to enter therein to lock the mounts when the two mounts 102 and 111 are rotated for mounting the lens 110. Further, the middle point of the camera-side contacts 106a to 106f is located about 90 degrees away from the lock pin 109 around the optical axis. The middle point of the lens-side contacts 114a to 114f is also arranged to be about 90 degrees away from the lock slot 115 around the optical axis.

Figure 10A:
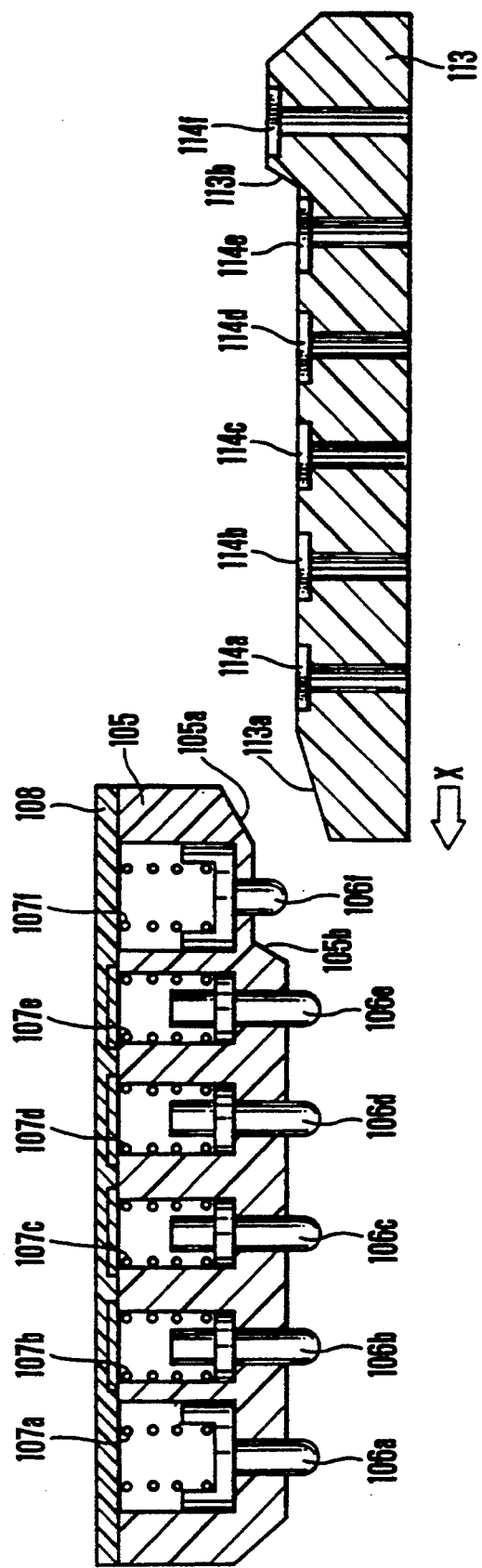

Among the camera-side contacts 106a to 106f, contacts 106a and 106f are related to a power supply. More specifically, the contact 106a is provided for grounding and the contact 106f for a high potential. The contacts 106b to 106e are related to communication. They are provided with a clock signal line and camera-to-lens and lens-to-camera transmission lines. The contact 106f which is one of the power-supply related contacts among the camera-side contacts is arranged to differ in height by one step from the height of others including the communication related contacts 106b to 106e and the other power-supply related contact 106a. This arrangement is as shown in FIG. 10(a) which shows the contacts as in their state before mounting. As shown, the camera-side contact 106f alone has its height stepped back (toward an image sensor) in the direction of the optical axis 0-0' (see FIG. 7). The springs 107a and 107f which are arranged to urge the power-supply related camera-side contacts 106a and 106f are arranged to have a larger urging force than the urging force of other springs 107b to 107e. This is for the purpose of lessening the contact resistance of the power-supply related contacts 106a, 106f, 114a and 114f by causing them to have larger contact pressure than the communication related contacts 106b to 106e and 114b to 114e when the camera-side and lens-side contacts come into contact with each other. Generally, the allowable contact resistance of power-supply contacts for a motor or the like and that of contacts for communication are arranged to differ from each other. For example, with the allowable contact resistance assumed to be less than 0.1 ohm for the power-supply related contacts, the allowable contact resistance is less than 1 ohm for the communication related contacts.

FIG. 10(b) shows these contact groups as in process of mounting. As shown, the camera-side contact 106f which has a different height from others does not slide over the non-corresponding lens-side contacts 114a to 114e during the process of mounting the lens as it protrudes to a lesser extent than other camera-side contacts 106a to 106e. In other words, the contact 106f is stepped back from others in the direction of the optical axis. Further, the lens-side contact 114f which corresponds to the above-stated camera-side contact 106f is arranged to have a higher protruding height than other lens-side contacts 114a to 114e. In the last stage of the rotatory mounting process, the contact 114f comes into contact with the camera-side contact 106f. At the same time, other lens-side contacts 114a to 114e respectively come into contact with corresponding camera-side contacts 106a to 106e in the last stage of the mounting process.

The rotatory mounting operation is as follows: FIG. 10(a) shows the contacts as in their initial state under the mounting operation. In this state, none of camera-side contacts 106a to 106f are in contact with any of the lens-side contacts 114a to 114f.

When the interchangeable lens 110 is rotated while moving the lens-side contact holder 113 in the direction of arrow X to bring it from the state of FIG. 10(a) to a state as shown in FIG. 10(b), the camera-side contacts 106e and 106d ride on a slanting face 13a of the lens-side contact holder 113 to come to slide over the surface of the contact holder 113 which is flush with top faces of the contacts 114a to 114e. FIG. 10(b) shows this intermediate state of the mounting operation.

FIG. 10(c) shows the completed state of the lens mounting operation. With the interchangeable lens 110 further rotated, the lens-side contact holder 113 is moved further in the direction of arrow X to its position as shown in FIG. 10(c). Under that condition, every contact is in contact with a corresponding contact.

The details of the action of each contact under the lens mounting operation are as follows: The camera-side contact 106f does not come into contact with (slide over) any of the lens-side contacts 114a to 114e in its phases opposed to them. The contact 106f then comes to ride on another slanting face 113b of the lens-side contact holder 113 to come into contact with the lens-side contact 114f. The camera-side contact 106e rides on the slanting face 113a and slides over the lens-side contacts 114a to 114d to finally come into contact with the corresponding lens-side contact 114e. The camera-side contact 106d also rides on the slanting face 113a to come into contact with the lens-side contact 114d after sliding over the lens-side contacts 114a to 114c. The camera-side contact 106c also rides on the slanting face 113a to come into contact with the lens-side contact 114c after sliding over the contacts 114a and 114b. The camera-side contact 106b likewise rides on the slanting face 113a and comes into contact with the corresponding lens-side contact 114b after sliding over the contact 114a. Further, the camera-side contact 106a also rides on the slanting face 113a to come into contact with the corresponding lens-side contact 114a. An important feature of the second embodiment lies in that: Among the camera-side contacts, the contacts 106a and 106f which have higher contact pressure than other contacts are arranged to come into sliding contact only once with the lens-side contacts respectively. Therefore, the adverse effect of the contact pressure which is increased for the purpose of reducing the contact resistance of the power-supply related contacts, i.e., an increase in wear resulting from the sliding contact under the increased pressure, is minimized, because these power-supply related contacts 106a and 106f never slide over the lens-side contacts 114b to 114e. Further, since the power-supply related camera-side contacts 106a and 106f never slide over the communication related lens-side contacts 114b to 114e when the mounts are rotated in mounting the lens, the rotatory mounting operation never electrically damages any circuit arranged within the interchangeable lens. Further, the number of times for which the camera-side and lens-side contacts as a whole come to slide over each other is lessened. Further, the power-supply related contacts 106a and 106f (114a and 114f) are disposed away from each other at the two ends of the contacts and arranged to have different heights. This arrangement effectively prevents any approaching conductive matter from causing a short-circuit accident.

These advantages are derivable first from that the camera-side contact 106f and the lens-side contact 114f which are disposed at the rear ends of the contact groups in the rotatory lens mounting direction are arranged to have a stepped difference in height in the sliding direction from other contacts. Without this stepped difference, the camera-side contact 106f would come into sliding contact with all the lens-side contacts 114a to 114f when the lens is mounted by rotating the mount thereof. Further, in the second place, the power-supply related contacts 106a and 106f (and contacts 114a and 114f) are disposed away from each other at the two ends of the row of the communication related contacts 106b to 106e (and 114b to 114e) and are arranged to have higher contact pressure than others.

Further, the slanting face 113b of the lens-side contact holder 113 is arranged to have a greater slanting angle than the other slanting face 113a for the purpose of preventing spaces between the contacts 114e and 114f and between the contacts 106e and 106f from becoming wider.

The second embodiment is characterized in that: The contact resistance allowable value of the power-supply related contact pairs 106a and 114a and 106f and 114f is set at a smaller value than that of the communication related contacts 106b to 106e and 114b to 114e. If the allowable value of the contact resistance of the power-supply related contact pairs 106a and 114a and 106f and 114f are specified to be less than 0.1 ohm, for example, it would sometimes be impossible to use coiled springs as conductive paths for them like the coiled springs 107b to 107e which are used for the communication related contacts. This is true because as long as the coiled spring is made of an ordinary conductive material, the electric resistance of the coiled spring by itself exceeds 0.1 ohm. For example, even in a case where the coiled spring is made of a material obtained by plating phosphor bronze with gold, it has an electrical resistance value of about 0.16 ohm. It is, therefore, impossible to clear the allowable value by increasing the contact pressure to the utmost degree.

In the case of the second embodiment, the power-supply related camera-side contacts 106a and 106f which are on the movable side are connected directly to lead wires of a small electrical resistance with some conductive adhesives like solder. The contact resistance is reduced by thus lessening the electric resistance of the conduction paths of the contacts 106a and 106f. The electric resistance of the lead wire varies according to its length and thickness. However, use of a lead wire having a sufficient thickness (measuring, for example 1 mm in diameter) gives a practically negligible degree of electric resistance.

Figure 11:
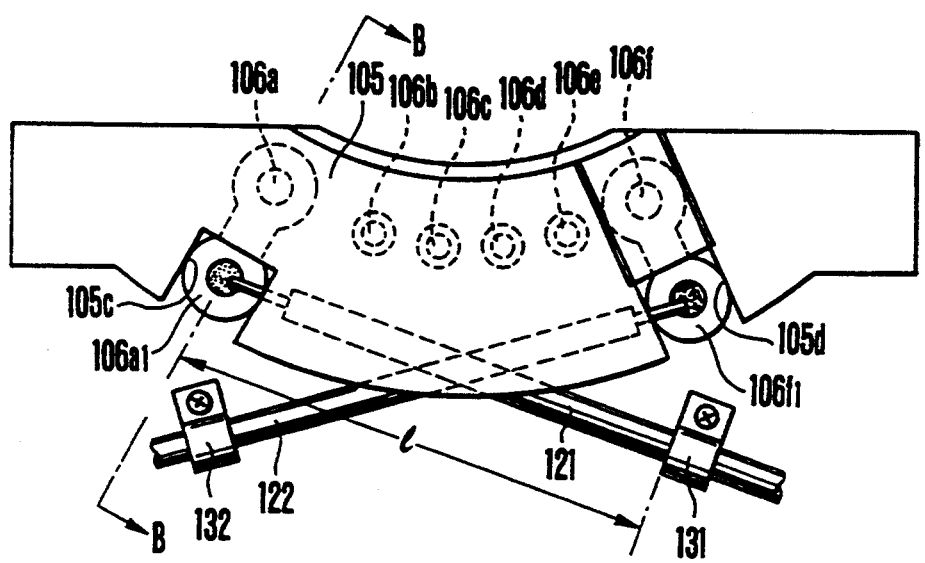
FIG. 11 shows only a part of the camera body around the contact group of the camera body.
Figure 12:
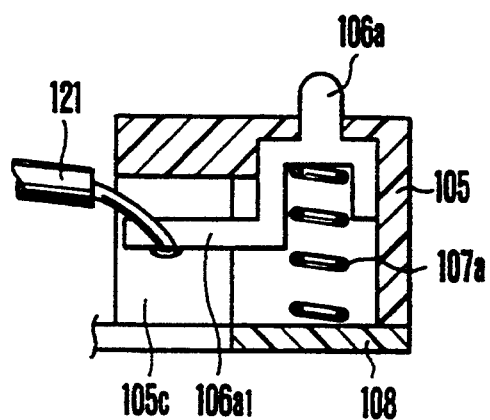
FIG. 12 is a sectional view taken on line B—B of FIG. 11.

More specific description of the arrangement is as follows: FIG. 11 shows the camera-side contacts and the part around them as viewed in the direction of the optical axis. FIG. 12 shows the essential parts in a sectional view. Among the contacts, only the power-supply related contacts 106a and 106f are provided with connection parts 106a1 and 106f1 which are extending perpendicularly to the contacting direction. These connection parts 106a1 and 106f1 are inserted into grooves 105c and 105d formed in the camera-side contact holder 105, so that the contacts 106a and 106f can be prevented from turning round. A lead wire 121 is soldered to the connection part 106a1 of the camera-side contact 106a and is pulled round toward the camera-side contact 106f disposed on the opposite end of the row of the contacts to be fixed in position by a clamp member 131. Further, another lead wire 122 is soldered to the connection part 106f1 of the camera-side contact 106f and is pulled round toward the camera-side contact 106a disposed on the opposite end of the row of contacts to be fixed in position by means of a clamp member 132. Each of the lead wires 121 and 122 is connected by soldering to applicable patterns (not shown) provided on a printed circuit board 108. Further, the connection parts 106a1 and 106f1 of the camera-side contacts 106a and 106f are formed on the contact side of the printed circuit board 108 in the direction of the optical axis. This obviates the necessity of providing a connecting space on the reverse side of the printed circuit board 108, i.e., on the inner side of camera body.

A first advantage of the above-stated arrangement resides in the use of the lead wire for the conduction path in place of the coiled spring for reduced contact resistance.

A second advantages of the embodiment resides in that the connection part is disposed on the contact side of the printed circuit board in the direction of the optical axis to obviate the necessity of providing any additional space for connection. In other words, it is most simple to provide holes in the printed circuit board 108, to have connecting shafts protrude from the middle parts of the camera-side contacts 106a and 106f, to have the tips of protruding shafts protrude through the holes from the reverse side of the printed circuit board 108 and to solder the lead wires to the shafts. However, this method necessitates some additional space within the camera body for allowing the lead wires to be arranged and the contacts to protrude inward. Then, depending on the internal mechanism such as the structural arrangement of a focusing device, the flange-back part must be arranged in a larger size. Whereas, the second embodiment of the invention is arranged to form the connection parts 106a1 and 106f1 of the camera-side contacts 106a and 106f on the contact side of the printed circuit board 108. This arrangement of the second embodiment obviates the necessity of increasing the flange-back.

A third advantage of the embodiment resides in that the camera-side contacts 106a and 106f to which the lead wires 121 and 122 are connected are arranged to be prevented from turning round by the connection parts 106a1 and 106f1 in conjunction with the grooves 105c and 105d. Generally, the camera-side contacts, such as the contacts 106b to 106e tend to receive a rotative moment when they slide and are somewhat urged to turn around in mounting the lens on the camera body. The turning movement of the camera-side contacts might cause some cracks in the soldered parts of the lead wires. To solve this problem, the second embodiment is arranged to prevent the camera-side contacts 106a to 106f from being turned around by the above-stated rotative moment.

A fourth advantage of the embodiment resides in that: The length l of the lead wires 121 and 122 is increased by arranging them to extend around the row of the contacts from one end to the other end of the row. This lessens a load imposed on the movement of the camera-side contacts 106a and 106f in the direction of the optical axis. In other words, considering electric resistance, the lead wires 121 and 122 cannot be too thin. They must have a certain thickness and must measure, say, 1 mm in diameter. With the contacts 106a and 106f moved in the direction of the optical axis when they come into contact with the lens-side contacts 114a and 114f, the lead wires 121 and 122 are somewhat deformed. This brings about some load at that instance. The movement of the camera-side contacts 106a and 106f is affected by this load. However, if the lengths l of the lead wires are arranged to be long as in the case of this embodiment, the adverse effect of the load is substantially decreased. The two lead wires 121 and 122 are stretched around to the opposite ends for the purpose of arranging the contacts in a compact size as well as for increasing their lengths l.

Figure 13:
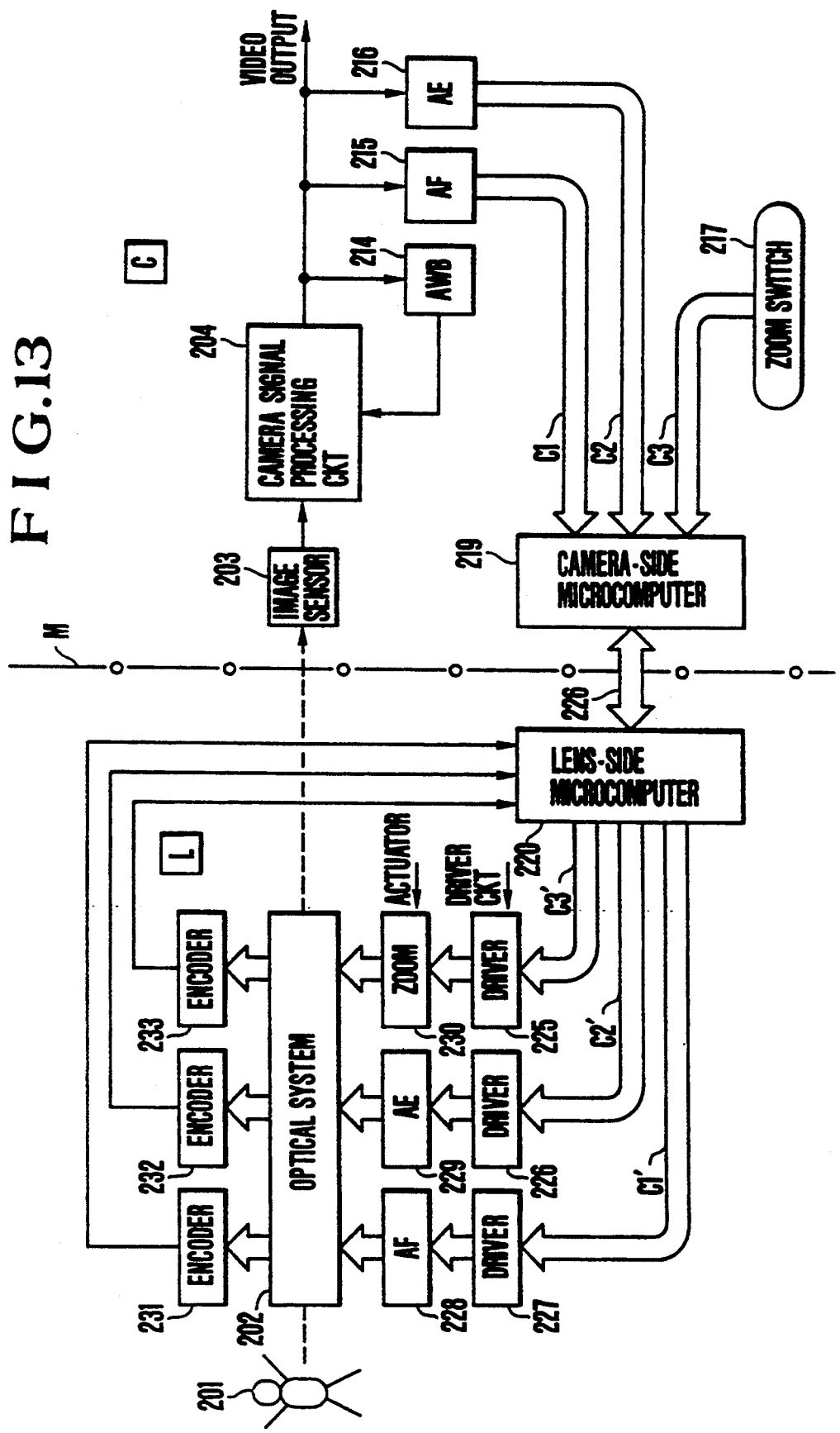
FIG. 13 is a block diagram showing the circuit arrangement of the camera system of the second embodiment.

FIG. 13 shows the circuit arrangement of the interchangeable-lens-using, camera-incorporating type VTR which is arranged on the basis of the embodiment described above. In FIG. 13, a camera unit C is shown on the right-hand side of a mount part M indicated with a one-dot chain line in the middle of the drawing. A lens unit L is shown on the left-hand side.

A light flux from an object 201 to be photographed is imaged on the image sensing plane of an image sensor 203. The object's image thus obtained is photoelectrically converted into an image signal by the image sensor 203. The image signal thus produced by the image sensor 203 is converted into a TV signal by a camera signal processing circuit 204. The TV signal is supplied to various automatic adjustment circuits including an automatic white balance adjustment circuit (hereinafter referred to as AWB circuit) 204; an automatic focusing circuit (hereinafter referred to as AF circuit) 215; and an automatic exposure control circuit (hereinafter referred to as AE circuit) 216. Various adjusting actions are performed by these circuits.

Each of these automatic adjustment circuits including the AWB circuit 214, the AF circuit 215 and the AE circuit 216 produces a control signal, which is applied to an applicable element to be controlled. The control signal output from the AWB circuit 214 which adjusts a color balance for the camera signal processing action is supplied to the camera signal processing circuit 204. Meanwhile, control signals C1 and C2 output from the AF circuit 215 and the AE circuit 216 are supplied to a microcomputer 219 which is disposed within the camera unit (hereinafter referred to as camera-side microcomputer). Another control signal C3 generated by a zoom switch 217 which is arranged to set the focal length of an optical system is also supplied to the camera-side microcomputer 219. These control signals are transmitted as communication data from the camera unit C to the lens unit L via a data communication path 226 which is formed by the electric contacts arranged at the mounts as mentioned in the foregoing.

The data communication path 226 is connected to a microcomputer 220 which is disposed within the lens unit L (hereinafter referred to as lens-side microcomputer). All the communication data is first received by the lens-side microcomputer 220.

The various control signals C1, C2 and C3 which are supplied to the camera-side microcomputer 219 are supplied to the lens-side microcomputer 220 via the data communication path 226 which includes the above-stated contacts 106b to 106e and the corresponding contacts 114b to 114e. These signals are then converted into control degrees C1', C2' and C3' suited for the elements to be controlled. The control degrees C1', C2' and C3' thus obtained are supplied to an AF driver circuit 227, an AE driver circuit 226 and a zoom driver circuit 225. The optical system 202 is controlled through actuators 228, 229 and 230 according to these control degrees.

The optical system 202 is provided with encoders 231, 232 and 233 for confirmation of the operating states of these actuators. The encoder 231 is provided for detection of a focus position; the encoder 232 for detection of an aperture position; and the encoder 233 for detection of information on a focal length resulting from a zooming action performed on the lens. Information on the result of detection obtained by each of these encoders is sent to the lens-side microcomputer 220. The encoder data thus obtained is not only used for lens control but also transmitted, as necessary, to the camera-side microcomputer 219. The data thus transmitted to the camera-side microcomputer 219 is used for AF and AE actions, etc. to be performed by the camera unit C.

Figure 14:
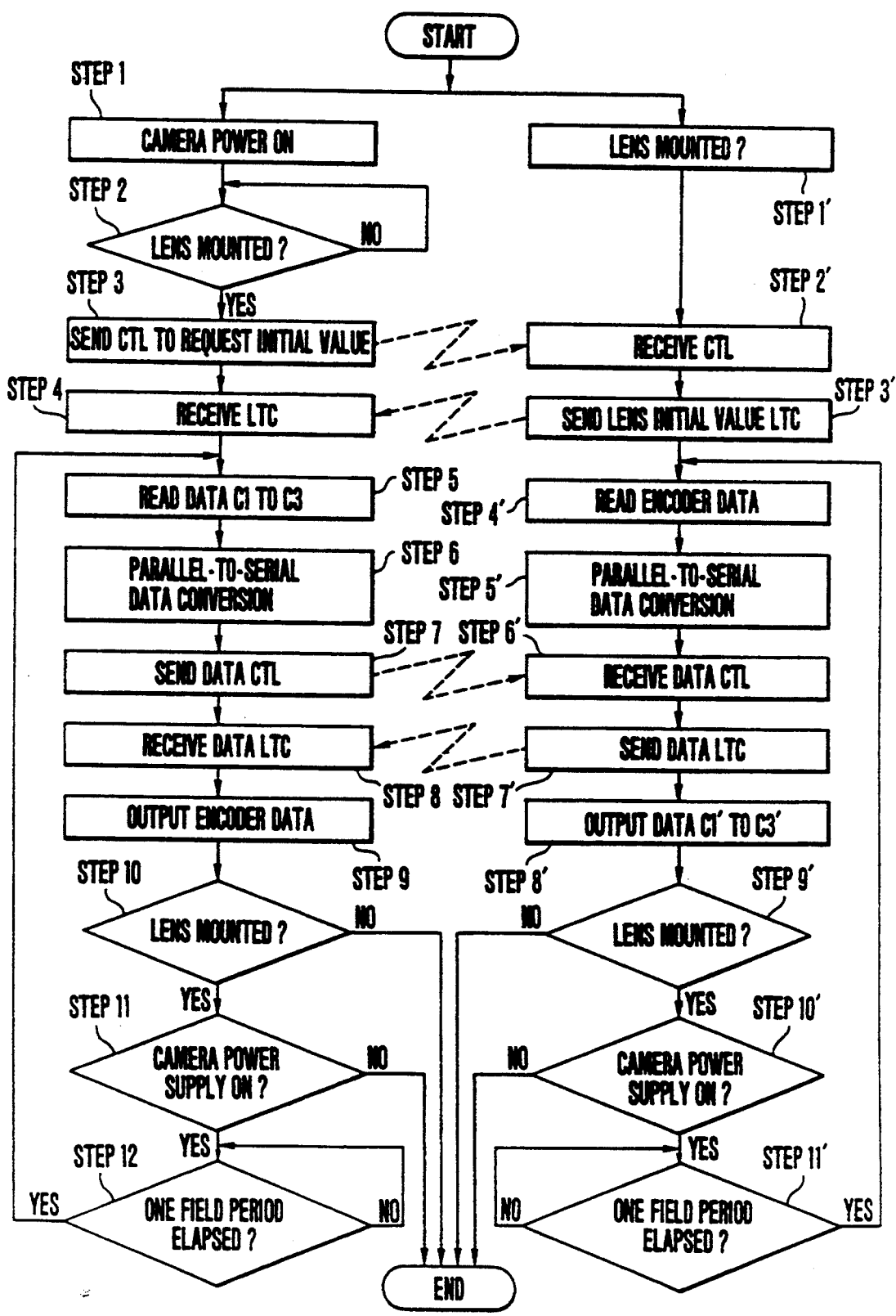
FIG. 14 is a flow chart showing the operation of the circuit shown in FIG. 13.

Next, the operation of the circuit arrangement of FIG. 13 is described as follows with reference to FIG. 14 which is a flow chart: Step 1: The power supply for the camera is switched on. Step 2: The camera-side microcomputer 219 makes a check for the mounted state of the lens. Step 3: A request for the initial data of the lens is sent via the data communication path 226.

Step 4: The initial lens data of varied kinds including the kind of the lens, etc. are received from the lens unit L. Step 5: On the side of the camera unit, the data of varied kinds C1, C2 and C3 are read by the camera-side microcomputer 219. Step 6: These data are parallel-to-serial converted into serial data CTL. Step 7: The serial data CTL is sent to the lens unit L.

Step 8: Data LTC including information on the results of detection performed by the encoders are received from the lens unit L. Step 9: Control actions of various kinds are performed while the data is output from each encoder. Steps 10 to 12: After the step 9, if the power supply of the camera is found to have been switched on with the lens mounted on the camera body, the flow of operation waits for the lapse of one field period and then comes back to the step of reading the data C1 to C3. If the lens is dismounted or if the power supply of the camera is turned off, this routine comes to an end.

The operation on the side of the lens unit L is as follows: Step 1': The lens is mounted on the camera body. Step 2': The request CTL for the initial data is received from the camera unit C. Step 3': The initial data of the lens unit L is sent to the camera unit C as the data LTC. In this instance, the initial data is read out from a ROM or the like connected to the lens-side microcomputer 220 and is parallel-to-serial converted before it is sent to the camera unit C. Step 4': Data on the states of the lens detected by the encoders 231, 232 and 233 are read by the lens-side microcomputer 220. Step 5': The data are parallel-to-serial converted.

Step 6': The data CTL is received. Step 7': After receipt of the data CTL, data LTC is sent out. Step 8': Further, data of varied kinds C1' to C3' obtained at the steps 4' and 5' are output. Steps 9', 10' and 11': If the power supply of the camera is in the on-state with the lens unit remaining mounted on the camera body, the flow of operation waits for the lapse of one field period. After the lapse of this waiting period, the flow comes back to repeat the encoder data reading step. This routine comes to an end if the lens is dismounted or if the power supply of the camera is turned off.

The communication of control data of various kinds is thus performed between the camera and lens units. For example, the AF control signal C1' is supplied to the driver circuit 227. In response to the output of the driver circuit 227, the AF actuator 228 adjusts the position of the optical system 202 to an in-focus position. The AE control signal C2' is supplied to the driver circuit 226. Then, in response to the output of the driver circuit 226, the AE actuator 229 adjusts the optical system 202 to an optimum aperture position. Further, for example, the zoom control signal C3' is supplied to the driver circuit 225. In response to the output of the driver circuit 225, the zoom actuator 230 adjusts the optical system 202 to a focal length position designated.

In the second embodiment described, the power-supply related camera-side contacts 106a and 106f and the power supply related lens-side contacts 114a and 114f are disposed in two end positions of the contact groups. However, the advantageous effect of the invention is attainable by arranging these power-supply related contacts differently. For example, some spare contact or two or three of the communication related contacts may be disposed on the left side of contact 106a or 114a as viewed on FIG. 10. Such modifications for example can be made within the scope of the invention.

Further, the embodiment described is arranged to connect only the camera-side power-supply related contacts 106a and 106f with the lead wires 121 and 122 and to prevent them from being turned round through the lead wires. This arrangement is, however, not limited to the power-supply related contacts. In a case where the communication related other contacts are connected by means of lead wires, they can be likewise effectively prevented from being turned around by suitably arranging and stretching round the lead wires.

While the lead wires are used in the case of the second embodiment, the use of lead wires may be changed, for example, in the following manner: The printed circuit board 108 is replaced with a flexible printed circuit board which is formed in the shape of a single strip; and the land parts of patterns formed on the strip are connected directly to the contacts.

The second embodiment is characterized by the arrangement made in a case where connection members such as lead wires are used for the purpose of lessening the contact resistance of the movable contacts. The arrangement ensures that the movable contacts can be prevented from disengaging the connection members; the contact part can be arranged in a compact size; and the movable contacts can be moved smoothly.

What is claimed is:

1. An optical apparatus having a group of connection contacts for electrical connection to another apparatus, said optical apparatus comprising:
   a holding member;
   a contact substrate, provided at a position adjacent to said holding member, on which a group of patterns are formed for electrical connection to said group of connection contacts, said group of patterns including patterns, which are related to power supply, and patterns, which are related to communication, said patterns related to power supply being formed to be wider than said patterns related to communication; and
   spring members, being disposed in said holding member, that electrically connect said group of connection contacts to said group of patterns.

2. An apparatus according to claim 1, wherein said patterns, which are related to power supply comprise a power-supply pattern and a grounding pattern.

3. An apparatus according to claim 2, wherein said power-supply pattern and said grounding pattern are arranged to have a larger area for contacting said spring members than said patterns, which are related to communication.

4. An apparatus according to claim 1, wherein said optical apparatus is a camera body.

5. An apparatus according to claim 2, wherein said group of connection contacts are carried by a holding member in such a way as to be movable in a contacting direction and are urged by said spring member to move in a contacting direction.

6. An apparatus according to claim 2, wherein said power-supply pattern and said grounding pattern are disposed at both ends of said patterns, which are related to communication.

7. An apparatus according to claim 1, wherein said spring members are coiled springs.

8. An apparatus according to claim 7, wherein a width of each of said patterns, which are related to communication is smaller than a diameter of said coiled springs.

9. An apparatus according to claim 8, wherein a width of each of said patterns, which are related to power supply is larger than a diameter of said coiled springs.

10. An apparatus according to claim 1, wherein said contact substrate is fixedly attached to said holding member.

11. An optical apparatus having a group of connection contacts arranged around an optical axis of said apparatus for electrical connection to another apparatus, said optical apparatus comprising:
   a contact substrate on which a group of patterns are formed for said group of connection contacts;
   spring members arranged to electrically connect said group of connection contacts to said group of patterns;
   a body member; and
   a holding member arranged to hold said contact substrate and said spring members, said holding member comprising at least one outwardly diametrally extending end portion disposed at an end of a diametral area within which said group of connection contacts are positioned, said holding member being secured to said body member at said at least one end portion.

12. An apparatus according to claim 11, further comprising screws, wherein said holding member is fixedly secured to said body member with said screws.

13. An apparatus according to claim 11, wherein said spring members are arranged at said group of connection contacts to exert an urging force on said group of connection contacts in the direction of the optical axis.

14. An apparatus according to claim 13, wherein said group of connection contacts are carried by a holding member in such a way as to be movable in the direction of the optical axis and are urged to move in the direction of the optical axis by said spring members; wherein said group of connection contacts are carried by said holding member in such a way as to have their contacting portions protrude from said holding member; and urging forces of said spring members are arranged to be increased by a pushing force of said other apparatus when said other apparatus is mounted on said optical apparatus.

15. An apparatus according to claim 11, wherein said holding member comprises two of said end portions, each being disposed at an opposite end of said diametral area.

16. An optical apparatus having a group of connection contacts carried by a support member and positioned in a periphery of a light flux coming from an object to be photographed and aligned approximately around an optical axis of said apparatus for electrical connection to another apparatus, said optical apparatus comprising:
   a contact substrate on which a group of patterns are formed for said group of connection contacts, said substrate being in a form overlapping said group of connection contacts in the direction of the optical axis;
   spring members arranged to exert a resilient urging force in the direction of the optical axis for electrically connecting said group of connection contacts to said group of patterns;
   a body member; and
   a holding member for holding said contact substrate, said support member including an area which has said group of connection contacts positioned therein and extends around the optical axis, said holding member being arranged to have two outwardly extending end portions thereof, an extending direction of said end portions proximate to each end of said group of connection contacts, deviating to an outward direction, said holding member being secured to said body member by said outwardly extending end portions.

17. An apparatus according to claim 16, further comprising screws, wherein said holding member is fixedly secured to said body member with said screws.

18. An apparatus according to claim 16, wherein said spring members are arranged at said group of connection contacts to exert an urging force on said group of connection contacts in the direction of the optical axis.

19. An apparatus according to claim 18, wherein said group of connection contacts are carried by a support member in such a way as to be movable in the direction of the optical axis and are urged to move in the direction of the optical axis by said spring members; said group of connection contacts are carried by said support member in such a way as to have their contacting portions protrude from said support member; and urging forces of said spring members are arranged to be increased by a pushing force of said other apparatus when said other apparatus is mounted on said optical apparatus.

20. An optical apparatus having a group of connection contacts aligned approximately around an optical axis in a position located along a periphery of a light flux coming from an object to be photographed, comprising:
   means for resiliently urging said group of connection contacts to move in the direction of the optical axis;
   a body member; and
   a holding member for holding said group of connection contacts in such a way as to be movable in the direction of the optical axis, said holding member comprising at least one outwardly diametrally extending end portion disposed at an end of an area containing said group of connection contacts and extending around the optical axis, said holding member being secured to said body member at said at least one end portion.

21. An apparatus according to claim 20, further comprising screws, wherein said holding member is fixedly secured to said body member with said screws.

22. An apparatus according to claim 20, wherein said group of connection contacts are urged in their positions by spring members to move in the direction of the optical axis.

23. An apparatus according to claim 20, wherein said holding member comprises two of said end portions, each being disposed at an opposite end of said area containing said group of connection contacts.

24. An optical apparatus having a group of contacts carried by a support member in such a way as to be movable in a contacting direction, characterized in that:
   at least one contact of said group of contacts is connected directly to a strip-like conductive member by an adhesive material for conduction to a circuit; and
   said one contact is carried by a support member in such a way as to prevent a turning movement thereof.

25. An apparatus according to claim 24, wherein the length of said conductive member is increased by arranging said conductive member around said support member from a position for connection to said one contact to one end of said support member which is located farther than the other end thereof from said contact connecting point.

26. An apparatus according to claim 24, wherein said adhesive is solder.

27. An optical apparatus having a group of contacts which are carried in such a way as to be movable in a contacting direction and a plurality of resilient members which are arranged to push said group of contacts in the contacting direction, characterized in that:
   at least one contact of said group of contacts is arranged to use one of said plurality of resilient members as an electrical conduction path for conduction to a circuit;
   other contacts of said group of contacts are connected directly to a strip-like conductive members by an adhesive material for conduction to circuits, connecting points between said conductive members and said contacts being arranged to be approximately at the same height as said plurality of resilient members in the contacting direction; and
   said contacts connected to said conductive members are arranged on a support member in such a way as to prevent a turning movement thereof.

28. An apparatus according to claim 27, wherein the length of said conductive member is increased by arranging said conductive member around said support member from a position for connection to said one contact to one end of said support member which is located farther than the other end thereof from said contact connecting point.

29. An apparatus according to claim 28, wherein said adhesive is solder.

* * * * *

UNITED STATES PATENT AND TRADEMARK OFFICE
CERTIFICATE OF CORRECTION

PATENT NO. : 5,404,190
DATED : April 4, 1995
INVENTOR(S) : Kohno et al.

It is certified that error appears in the above-indentified patent and that said Letters Patent is hereby corrected as shown below:

Column 10:

Line 11, "that: The" should read --that the--.

COLUMN 11:

Line 9, "advantages" should read --advantage--;
Line 34, "connected" should read --connected,--; and
Line 48, "that: The"" should read --that the--.

COLUMN 14:

Line 10, "modifications for example" should read --modifications, for example,--

UNITED STATES PATENT AND TRADEMARK OFFICE
CERTIFICATE OF CORRECTION

PATENT NO. : 5,404,190
DATED : April 4, 1995
INVENTOR(S) : Kohno et al.

It is certified that error appears in the above-indentified patent and that said Letters Patent is hereby corrected as shown below:

COLUMN 15:

Line 3, "patterns ," should read --patterns,--.

COLUMN 16:

Line 31, "members;" should read --members; wherein--.

Signed and Sealed this

Fourth Day of July, 1995

Attest:

BRUCE LEHMAN

Attesting Officer   Commissioner of Patents and Trademarks